US009946302B2

(12) United States Patent
Franklin et al.

(10) Patent No.: US 9,946,302 B2
(45) Date of Patent: Apr. 17, 2018

(54) EXPOSED GLASS ARTICLE WITH INNER RECESSED AREA FOR PORTABLE ELECTRONIC DEVICE HOUSING

(71) Applicant: Apple Inc., Cupertino, CA (US)

(72) Inventors: Jeremy C. Franklin, San Francisco, CA (US); Ming Leong, Saratoga, CA (US); Kristina A. Babiarz, San Jose, CA (US); Amy Qian, San Jose, CA (US); Kevin David Gibbs, San Carlos, CA (US); Eugene C. Cheung, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 225 days.

(21) Appl. No.: 13/843,426

(22) Filed: Mar. 15, 2013

(65) Prior Publication Data

US 2014/0078412 A1    Mar. 20, 2014

Related U.S. Application Data

(60) Provisional application No. 61/702,969, filed on Sep. 19, 2012.

(51) Int. Cl.
*G06F 1/16* (2006.01)
*C03C 21/00* (2006.01)
*C03C 17/00* (2006.01)

(52) U.S. Cl.
CPC .......... *G06F 1/1643* (2013.01); *C03C 17/002* (2013.01); *C03C 21/002* (2013.01); *B32B 2307/41* (2013.01)

(58) Field of Classification Search
CPC ..... G06F 1/1643; C03C 17/00; C03C 17/002; C03C 21/002; B32B 2307/41
(Continued)

(56) References Cited

U.S. PATENT DOCUMENTS 2,643,020 A    6/1953  Dalton
3,415,637 A   12/1968  Glynn
(Continued)

FOREIGN PATENT DOCUMENTS

AT    283 630 B   10/1970
CN   1277090 A   12/2000
(Continued)

OTHER PUBLICATIONS

Invitation to Pay Additional Fees for PCT Application No. PCT/US2013/059072, dated Jan. 8, 2014.
(Continued)

*Primary Examiner* — Benyam Ketema
(74) *Attorney, Agent, or Firm* — Brownstein Hyatt Farber Schreck, LLP

(57) ABSTRACT

Transparent articles for use as outer surfaces of electronic devices and methods therefor are disclosed. A transparent cover can be provided over a display of portable electronic device to provide a protective outer cover over the display. The transparent cover can include material to mark, mask or color a portion of the transparent cover, such portion thereupon becoming opaque. The material can be provided in a recessed portion of an inner surface of the transparent cover, such portion being a portion of the transparent cover that is not over a usable portion of the display. The electronic device can, for example, be a portable electronic device.

33 Claims, 8 Drawing Sheets

(58) Field of Classification Search
USPC .............................. 345/173; 65/30.14, 155
See application file for complete search history.

(56) References Cited

U.S. PATENT DOCUMENTS

| | | | |
|---|---|---|---|
| 3,441,398 A | 4/1969 | Hess | |
| 3,467,508 A | 9/1969 | Loukes et al. | |
| 3,498,773 A | 3/1970 | Due et al. | |
| 3,558,415 A | 1/1971 | Rieser et al. | |
| 3,607,172 A | 9/1971 | Poole et al. | |
| 3,619,240 A | 11/1971 | Toussaint et al. | |
| 3,626,723 A | 12/1971 | Plumat | |
| 3,652,244 A | 3/1972 | Plumat | |
| 3,753,840 A | 8/1973 | Plumat | |
| 3,798,013 A | 3/1974 | Inoue et al. | |
| 3,843,472 A | 10/1974 | Toussaint et al. | |
| 3,857,689 A | 12/1974 | Koizumi et al. | |
| 3,926,605 A | 12/1975 | Kunkle | |
| 3,951,707 A | 4/1976 | Kurtz et al. | |
| 4,015,045 A | 3/1977 | Rinehart | |
| 4,052,184 A | 10/1977 | Anderson | |
| 4,119,760 A | 10/1978 | Rinehart | |
| 4,156,755 A | 5/1979 | Rinehart | |
| 4,165,228 A | 8/1979 | Ebata et al. | |
| 4,178,082 A | 12/1979 | Ganswein et al. | |
| 4,212,919 A | 7/1980 | Hoda | |
| 4,218,230 A | 8/1980 | Hogan | |
| 4,346,601 A | 8/1982 | France | |
| 4,353,649 A | 10/1982 | Kishii | |
| 4,425,810 A | 1/1984 | Simon et al. | |
| 4,537,820 A | 8/1985 | Nowobliski et al. | |
| 4,646,722 A | 3/1987 | Silverstein et al. | |
| 4,733,973 A | 3/1988 | Machak et al. | |
| 4,842,629 A | 6/1989 | Clemens et al. | |
| 4,844,724 A | 7/1989 | Sakai et al. | |
| 4,846,868 A | 7/1989 | Aratani | |
| 4,849,002 A | 7/1989 | Rapp | |
| 4,872,896 A | 10/1989 | LaCourse et al. | |
| 4,911,743 A | 3/1990 | Bagby | |
| 4,937,129 A | 6/1990 | Yamazaki | |
| 4,957,364 A | 9/1990 | Chesler | |
| 4,959,548 A | 9/1990 | Kupperman et al. | |
| 4,983,197 A | 1/1991 | Froning et al. | |
| 4,986,130 A | 1/1991 | Engelhaupt et al. | |
| 5,041,173 A | 8/1991 | Shikata et al. | |
| 5,104,435 A | 4/1992 | Oikawa et al. | |
| 5,129,934 A | 7/1992 | Koss | |
| 5,157,746 A | 10/1992 | Tobita et al. | |
| 5,160,523 A | 11/1992 | Honkanen et al. | |
| 5,254,149 A | 10/1993 | Hashemi et al. | |
| 5,269,888 A | 12/1993 | Morasca | |
| 5,281,303 A | 1/1994 | Beguin et al. | |
| 5,369,267 A | 11/1994 | Johnson et al. | |
| 5,411,563 A | 5/1995 | Yeh | |
| 5,437,193 A | 8/1995 | Schleitweiler et al. | |
| 5,445,871 A | 8/1995 | Murase et al. | |
| 5,483,261 A | 1/1996 | Yasutake | |
| 5,488,204 A | 1/1996 | Mead et al. | |
| 5,525,138 A | 6/1996 | Hashemi et al. | |
| 5,625,154 A | 4/1997 | Matsuhiro et al. | |
| 5,654,057 A | 8/1997 | Kitayama | |
| 5,725,625 A | 3/1998 | Kitayama et al. | |
| 5,733,622 A | 3/1998 | Starcke et al. | |
| 5,766,493 A | 6/1998 | Shin | |
| 5,780,371 A | 7/1998 | Rifqi et al. | |
| 5,816,225 A | 10/1998 | Koch et al. | |
| 5,825,352 A | 10/1998 | Bisset et al. | |
| 5,826,601 A | 10/1998 | Muraoka et al. | |
| 5,835,079 A | 11/1998 | Shieh | |
| 5,880,411 A | 3/1999 | Gillespie et al. | |
| 5,880,441 A | 3/1999 | Gillespie et al. | |
| 5,930,047 A | 7/1999 | Gunz et al. | |
| 5,953,094 A | 9/1999 | Matsuoka et al. | |
| 5,985,014 A | 11/1999 | Ueda et al. | |
| 6,050,870 A | 4/2000 | Suginoya et al. | |
| 6,114,039 A | 9/2000 | Rifqui | |
| 6,120,908 A | 9/2000 | Papanu et al. | |
| 6,166,915 A | 12/2000 | Lake et al. | |
| 6,188,391 B1 | 2/2001 | Seely et al. | |
| 6,245,313 B1 | 6/2001 | Suzuki et al. | |
| 6,287,674 B1 | 9/2001 | Verlinden et al. | |
| 6,307,590 B1 | 10/2001 | Yoshida | |
| 6,310,610 B1 | 10/2001 | Beaton et al. | |
| 6,323,846 B1 | 11/2001 | Westerman et al. | |
| 6,325,704 B1 | 12/2001 | Brown et al. | |
| 6,327,011 B2 | 12/2001 | Kim | |
| 6,350,664 B1 | 2/2002 | Haji et al. | |
| 6,393,180 B1 | 5/2002 | Farries et al. | |
| 6,429,840 B1 | 8/2002 | Sekiguchi | |
| 6,437,867 B2 | 8/2002 | Zeylikovich et al. | |
| 6,516,634 B1 | 2/2003 | Green et al. | |
| 6,521,862 B1 | 2/2003 | Brannon | |
| 6,621,542 B1 | 9/2003 | Aruga | |
| 6,690,387 B2 | 2/2004 | Zimmerman et al. | |
| 6,718,612 B2 | 4/2004 | Bajorek | |
| 6,769,274 B2 | 8/2004 | Cho et al. | |
| 6,772,610 B1 | 8/2004 | Albrand et al. | |
| 6,810,688 B1 | 11/2004 | Duisit et al. | |
| 6,936,741 B2 | 8/2005 | Munnig et al. | |
| 6,955,971 B2 | 10/2005 | Ghyselen et al. | |
| 6,996,324 B2 | 2/2006 | Hiraka et al. | |
| 7,012,700 B2 | 3/2006 | De Groot et al. | |
| 7,013,709 B2 | 3/2006 | Hajduk et al. | |
| 7,015,894 B2 | 3/2006 | Morohoshi | |
| 7,070,837 B2 | 7/2006 | Ross | |
| 7,166,531 B1 | 1/2007 | van Den Hoek et al. | |
| 7,184,064 B2 | 2/2007 | Zimmerman et al. | |
| 7,461,564 B2 | 12/2008 | Glaesemann | |
| 7,558,054 B1 | 7/2009 | Prest et al. | |
| 7,626,807 B2 | 12/2009 | Hsu | |
| 7,663,607 B2 | 2/2010 | Hotelling et al. | |
| 7,810,355 B2 | 10/2010 | Feinstein et al. | |
| 7,872,644 B2 | 1/2011 | Hong et al. | |
| 7,918,019 B2 | 4/2011 | Chang et al. | |
| 8,013,834 B2 * | 9/2011 | Kim | G06F 1/1616 345/156 |
| 8,110,268 B2 | 2/2012 | Hegemier et al. | |
| 8,111,248 B2 | 2/2012 | Lee et al. | |
| 8,312,743 B2 | 11/2012 | Pun et al. | |
| 8,339,537 B2 * | 12/2012 | Bo | G02F 1/133308 349/58 |
| 8,393,175 B2 | 3/2013 | Kohli et al. | |
| 8,442,593 B1 * | 5/2013 | Kwon | H04M 1/0266 455/556.1 |
| 8,551,283 B2 | 10/2013 | Pakula et al. | |
| 8,642,175 B2 * | 2/2014 | Hashimoto | C03C 15/00 428/410 |
| 8,673,163 B2 | 3/2014 | Zhong | |
| 8,684,613 B2 | 4/2014 | Weber et al. | |
| 8,749,529 B2 * | 6/2014 | Powell | G06F 3/0412 345/173 |
| 8,824,140 B2 | 9/2014 | Prest | |
| 8,937,689 B2 * | 1/2015 | Prest | C03C 19/00 345/173 |
| 9,128,666 B2 * | 9/2015 | Werner | G06F 1/1626 |
| 9,207,528 B2 * | 12/2015 | Hong | G03B 27/32 |
| 2002/0035853 A1 | 3/2002 | Brown et al. | |
| 2002/0105793 A1 | 8/2002 | Oda | |
| 2002/0155302 A1 | 10/2002 | Smith et al. | |
| 2002/0157199 A1 | 10/2002 | Piltingsrud | |
| 2003/0024274 A1 | 2/2003 | Cho et al. | |
| 2003/0057183 A1 | 3/2003 | Cho et al. | |
| 2003/0077453 A1 | 7/2003 | Oaku et al. | |
| 2003/0234771 A1 | 12/2003 | Mulligan et al. | |
| 2004/0051944 A1 | 3/2004 | Stark | |
| 2004/0119701 A1 | 6/2004 | Mulligan et al. | |
| 2004/0137828 A1 | 7/2004 | Takahashi et al. | |
| 2004/0142118 A1 * | 7/2004 | Takechi | H01L 29/78603 428/1.6 |
| 2004/0163414 A1 | 8/2004 | Eto et al. | |
| 2005/0058423 A1 | 3/2005 | Brinkmann et al. | |
| 2005/0105071 A1 | 5/2005 | Ishii | |
| 2005/0135724 A1 | 6/2005 | Helvajian et al. | |
| 2005/0174525 A1 | 8/2005 | Tsuboi | |

(56) References Cited

U.S. PATENT DOCUMENTS

| | | |
|---|---|---|
| 2005/0193772 A1 | 9/2005 | Davidson et al. |
| 2005/0245165 A1 | 11/2005 | Harada et al. |
| 2005/0259438 A1 | 11/2005 | Mizutani |
| 2005/0285991 A1* | 12/2005 | Yamazaki ......... G02F 1/133308 349/58 |
| 2006/0026521 A1 | 2/2006 | Hotelling et al. |
| 2006/0055936 A1 | 3/2006 | Yun et al. |
| 2006/0063351 A1 | 3/2006 | Jain |
| 2006/0070694 A1 | 4/2006 | Rehfeld et al. |
| 2006/0097991 A1 | 5/2006 | Hotelling et al. |
| 2006/0197753 A1 | 9/2006 | Hotelling et al. |
| 2006/0227331 A1 | 10/2006 | Wollmer et al. |
| 2006/0238695 A1 | 10/2006 | Miyamoto |
| 2006/0250559 A1* | 11/2006 | Bocko ..................... B32B 7/06 349/139 |
| 2006/0268528 A1 | 11/2006 | Zadeksky et al. |
| 2006/0292822 A1 | 12/2006 | Xie |
| 2007/0003796 A1 | 1/2007 | Isono et al. |
| 2007/0013822 A1* | 1/2007 | Kawata ............... G02F 1/13452 349/41 |
| 2007/0029519 A1 | 2/2007 | Kikuyama et al. |
| 2007/0030436 A1 | 2/2007 | Sasabayashi |
| 2007/0039353 A1 | 2/2007 | Kamiya |
| 2007/0046200 A1 | 3/2007 | Fu et al. |
| 2007/0063876 A1 | 3/2007 | Wong |
| 2007/0065091 A1* | 3/2007 | Hinata .............. G02F 1/133308 385/147 |
| 2007/0089827 A1 | 4/2007 | Funatsu |
| 2007/0122542 A1 | 5/2007 | Halsey et al. |
| 2007/0132737 A1 | 6/2007 | Mulligan et al. |
| 2007/0196578 A1 | 8/2007 | Karp et al. |
| 2007/0236618 A1 | 10/2007 | Magg et al. |
| 2008/0020919 A1 | 1/2008 | Murata |
| 2008/0026260 A1 | 1/2008 | Kawai |
| 2008/0074028 A1 | 3/2008 | Ozolins et al. |
| 2008/0094716 A1 | 4/2008 | Ushiro et al. |
| 2008/0135157 A1 | 6/2008 | Higuchi |
| 2008/0135175 A1* | 6/2008 | Higuchi ................... B32B 7/06 156/718 |
| 2008/0158181 A1 | 7/2008 | Hamblin et al. |
| 2008/0202167 A1 | 8/2008 | Cavallaro et al. |
| 2008/0230177 A1 | 9/2008 | Crouser et al. |
| 2008/0243321 A1 | 10/2008 | Walser et al. |
| 2008/0261057 A1* | 10/2008 | Slobodin .......... G02F 1/133308 428/447 |
| 2008/0264176 A1 | 10/2008 | Bertrand et al. |
| 2008/0286548 A1 | 11/2008 | Ellison et al. |
| 2008/0317303 A1* | 12/2008 | Konno ................. G06K 9/2027 382/124 |
| 2009/0046240 A1 | 2/2009 | Bolton |
| 2009/0067141 A1 | 3/2009 | Dabov et al. |
| 2009/0090694 A1* | 4/2009 | Hotelling ................ G06F 3/044 216/41 |
| 2009/0091551 A1 | 4/2009 | Hotelling et al. |
| 2009/0096937 A1 | 4/2009 | Bauer et al. |
| 2009/0153729 A1 | 6/2009 | Hiltunen et al. |
| 2009/0162703 A1 | 6/2009 | Kawai |
| 2009/0197048 A1 | 8/2009 | Amin et al. |
| 2009/0202808 A1 | 8/2009 | Glaesemann et al. |
| 2009/0220761 A1 | 9/2009 | Dejneka et al. |
| 2009/0257189 A1 | 10/2009 | Wang et al. |
| 2009/0294420 A1 | 12/2009 | Abramov et al. |
| 2009/0324899 A1 | 12/2009 | Feinstein et al. |
| 2009/0324939 A1 | 12/2009 | Feinstein et al. |
| 2010/0009154 A1 | 1/2010 | Allan et al. |
| 2010/0024484 A1 | 2/2010 | Kashima |
| 2010/0028607 A1 | 2/2010 | Lee et al. |
| 2010/0035038 A1 | 2/2010 | Barefoot et al. |
| 2010/0053632 A1 | 3/2010 | Alphonse et al. |
| 2010/0062284 A1 | 3/2010 | Watanabe et al. |
| 2010/0119846 A1 | 5/2010 | Sawada |
| 2010/0137031 A1 | 6/2010 | Griffin et al. |
| 2010/0154992 A1* | 6/2010 | Feinstein ........... B32B 38/0004 156/711 |
| 2010/0167059 A1* | 7/2010 | Hashimoto ............. C03C 15/00 428/410 |
| 2010/0171920 A1 | 7/2010 | Nishiyama |
| 2010/0179044 A1 | 7/2010 | Sellier et al. |
| 2010/0206008 A1 | 8/2010 | Harvey et al. |
| 2010/0215862 A1 | 8/2010 | Gomez et al. |
| 2010/0216514 A1 | 8/2010 | Smoyer et al. |
| 2010/0224767 A1 | 9/2010 | Kawano et al. |
| 2010/0265188 A1 | 10/2010 | Chang et al. |
| 2010/0279067 A1 | 11/2010 | Sabia et al. |
| 2010/0285260 A1* | 11/2010 | Bookbinder ............. B32B 3/02 428/45 |
| 2010/0285275 A1 | 11/2010 | Baca et al. |
| 2010/0296027 A1 | 11/2010 | Matsuhira et al. |
| 2010/0315570 A1 | 12/2010 | Dinesh et al. |
| 2010/0321305 A1 | 12/2010 | Chang et al. |
| 2011/0003619 A1 | 1/2011 | Fujii |
| 2011/0012873 A1* | 1/2011 | Prest ................... H01L 51/5237 345/204 |
| 2011/0019123 A1* | 1/2011 | Prest ....................... C03C 19/00 349/58 |
| 2011/0019354 A1* | 1/2011 | Prest ....................... C03C 19/00 361/679.21 |
| 2011/0030209 A1 | 2/2011 | Chang et al. |
| 2011/0063550 A1* | 3/2011 | Gettemy ................ G02F 1/1333 349/110 |
| 2011/0067447 A1 | 3/2011 | Zadesky et al. |
| 2011/0072856 A1 | 3/2011 | Davidson et al. |
| 2011/0102346 A1 | 5/2011 | Orsley et al. |
| 2011/0111176 A1* | 5/2011 | Chiu ......................... B32B 3/02 428/157 |
| 2011/0159321 A1 | 6/2011 | Eda et al. |
| 2011/0164372 A1 | 7/2011 | McClure et al. |
| 2011/0182084 A1 | 7/2011 | Tomlinson |
| 2011/0186345 A1 | 8/2011 | Pakula et al. |
| 2011/0188846 A1 | 8/2011 | Sorg |
| 2011/0199687 A1 | 8/2011 | Sellier et al. |
| 2011/0248152 A1 | 10/2011 | Svajda et al. |
| 2011/0255000 A1 | 10/2011 | Weber et al. |
| 2011/0255250 A1 | 10/2011 | Dinh |
| 2011/0267833 A1 | 11/2011 | Verrat-Debailleul et al. |
| 2011/0279383 A1* | 11/2011 | Wilson et al. .................. 345/173 |
| 2011/0300908 A1 | 12/2011 | Grespan et al. |
| 2012/0018323 A1 | 1/2012 | Johnson et al. |
| 2012/0088067 A1 | 4/2012 | Rappoport et al. |
| 2012/0099113 A1 | 4/2012 | de Boer et al. |
| 2012/0105400 A1 | 5/2012 | Mathew et al. |
| 2012/0118628 A1 | 5/2012 | Pakula et al. |
| 2012/0135195 A1* | 5/2012 | Glaesemann ........ B23K 26/073 428/156 |
| 2012/0136259 A1 | 5/2012 | Milner et al. |
| 2012/0151760 A1 | 6/2012 | Steijner |
| 2012/0188743 A1 | 7/2012 | Wilson et al. |
| 2012/0196071 A1 | 8/2012 | Cornejo et al. |
| 2012/0202040 A1 | 8/2012 | Barefoot et al. |
| 2012/0227399 A1 | 9/2012 | Karch |
| 2012/0236477 A1 | 9/2012 | Weber et al. |
| 2012/0236526 A1* | 9/2012 | Weber ........................... 361/807 |
| 2012/0281381 A1* | 11/2012 | Sanford ................ G06F 1/1626 361/807 |
| 2012/0328843 A1 | 12/2012 | Cleary et al. |
| 2013/0071601 A1* | 3/2013 | Bibl ........................... B32B 3/02 428/67 |
| 2013/0083506 A1 | 4/2013 | Wright et al. |
| 2013/0155004 A1* | 6/2013 | Yoshikawa ............. C03C 15/00 345/174 |
| 2013/0182259 A1 | 7/2013 | Brezinski et al. |
| 2013/0213565 A1 | 8/2013 | Lee et al. |
| 2014/0176779 A1 | 6/2014 | Weber et al. |
| 2014/0178647 A1* | 6/2014 | Kim ........................ B44C 5/0407 428/166 |

FOREIGN PATENT DOCUMENTS

| | | |
|---|---|---|
| CN | 1369449 A | 9/2002 |
| CN | 1694589 A | 11/2005 |
| CN | 101025502 | 8/2007 |
| CN | 101206314 | 6/2008 |

(56) References Cited

FOREIGN PATENT DOCUMENTS

| | | |
|---|---|---|
| CN | 101523275 | 2/2009 |
| CN | 101465892 | 6/2009 |
| CN | 101515212 | 8/2009 |
| CN | 102047645 | 5/2011 |
| CN | 102131357 | 7/2011 |
| CN | 101267509 | 8/2011 |
| CN | 102196684 | 9/2011 |
| CN | 1322339 A | 11/2011 |
| CN | 202799425 U | 3/2013 |
| DE | 14 96 586 A1 | 6/1969 |
| DE | 17 71 268 A1 | 12/1971 |
| DE | 32 12 612 A1 | 10/1983 |
| DE | 103 22 350 A1 | 12/2004 |
| DE | 202005005064 | 6/2005 |
| EP | 1038663 A2 | 9/2000 |
| EP | 1 206 422 B1 | 11/2002 |
| EP | 1 593 658 A1 | 11/2005 |
| EP | 1592073 | 11/2005 |
| EP | 2025556 A2 | 2/2009 |
| EP | 2036867 A1 | 3/2009 |
| EP | 2075237 | 7/2009 |
| EP | 2196870 A1 | 6/2010 |
| EP | 2233447 | 9/2010 |
| EP | 2483216 | 8/2012 |
| EP | 2635540 | 9/2013 |
| FR | 2 797 627 A1 | 2/2001 |
| FR | 2 801 302 A1 | 5/2001 |
| GB | 1 346 747 | 2/1974 |
| JP | B S42-011599 | 6/1963 |
| JP | B-S48-006925 | 3/1973 |
| JP | 55031944 | 3/1980 |
| JP | 55 067529 | 5/1980 |
| JP | 55-95645 | 7/1980 |
| JP | A S55-136979 | 10/1980 |
| JP | 55 144450 | 11/1980 |
| JP | A S59-013638 | 1/1984 |
| JP | 59037451 | 2/1984 |
| JP | A S61-097147 | 5/1986 |
| JP | 6066696 | 10/1986 |
| JP | 63 060129 | 3/1988 |
| JP | 63222234 | 9/1988 |
| JP | 5-32431 | 2/1993 |
| JP | 05249422 | 9/1993 |
| JP | 6242260 A | 9/1994 |
| JP | A H07-050144 | 2/1995 |
| JP | 52031757 | 3/1997 |
| JP | A-H09-073072 | 3/1997 |
| JP | A H09-507206 | 7/1997 |
| JP | 09-312245 | 12/1997 |
| JP | A 2000-086261 | 3/2000 |
| JP | 2000-163031 | 6/2000 |
| JP | 200203895 A | 7/2000 |
| JP | A 2001-083887 | 3/2001 |
| JP | A 2002-160932 | 6/2002 |
| JP | 2002-342033 | 11/2002 |
| JP | A 2002-338283 | 11/2002 |
| JP | A2003502257 | 1/2003 |
| JP | A2003-146705 | 5/2003 |
| JP | A 2004-094256 | 3/2004 |
| JP | A2004-259402 | 9/2004 |
| JP | A2004-339019 | 12/2004 |
| JP | 2005-165249 | 6/2005 |
| JP | A 2005-156766 | 6/2005 |
| JP | A 2005140901 | 6/2005 |
| JP | 2007-099557 | 4/2007 |
| JP | 2008-001590 | 1/2008 |
| JP | 2008007360 | 1/2008 |
| JP | 2008-63166 A | 3/2008 |
| JP | 2008-066126 A | 3/2008 |
| JP | 2008-192194 | 8/2008 |
| JP | A 2008-195602 | 8/2008 |
| JP | A 2008-216938 | 9/2008 |
| JP | A 2008-306149 | 12/2008 |
| JP | A 2009-167086 | 7/2009 |
| JP | A 2009-234856 | 10/2009 |
| JP | A2009230341 | 10/2009 |
| JP | 2010 064943 | 3/2010 |
| JP | A 2010-060908 | 3/2010 |
| JP | A 2010-116276 | 5/2010 |
| JP | 2010/195600 | 9/2010 |
| JP | A 2010-237493 | 10/2010 |
| JP | 2011-032124 | 2/2011 |
| JP | A 2011-032140 | 2/2011 |
| JP | A 2011-158799 | 8/2011 |
| JP | 2011-527661 | 11/2011 |
| JP | A 2011-231009 | 11/2011 |
| JP | A 2013-537723 | 10/2013 |
| KR | 2010-2006-005920 | 1/2006 |
| KR | 10-2010-0019526 | 2/2010 |
| KR | 10-2011-0030919 | 3/2011 |
| TW | 201007521 A | 2/2010 |
| TW | 201235744 A1 | 9/2012 |
| WO | WO 00/47529 A | 8/2000 |
| WO | WO 02/42838 A1 | 5/2002 |
| WO | WO 2004/014109 | 2/2004 |
| WO | WO 2004-061806 | 7/2004 |
| WO | WO 2004/106253 A | 12/2004 |
| WO | WO 2007/089054 A1 | 8/2007 |
| WO | WO 2008/044694 A | 4/2008 |
| WO | WO 2008/143999 A1 | 11/2008 |
| WO | WO 2009/003029 | 12/2008 |
| WO | WO 2009/078406 | 6/2009 |
| WO | WO 2009/099615 | 8/2009 |
| WO | WO 2009/102326 | 8/2009 |
| WO | WO 2009125133 A2 | 10/2009 |
| WO | WO 2010/005578 | 1/2010 |
| WO | WO 2010/014163 | 2/2010 |
| WO | WO 2010/019829 A1 | 2/2010 |
| WO | WO 2010/080988 | 7/2010 |
| WO | WO 2010/101961 | 9/2010 |
| WO | WO 2011/008433 | 1/2011 |
| WO | WO 2011/041484 A1 | 4/2011 |
| WO | WO 2012/015960 | 2/2012 |
| WO | WO 2012/027220 A2 | 3/2012 |
| WO | WO 2012/106280 | 8/2012 |
| WO | WO 2013/106242 A2 | 7/2013 |

OTHER PUBLICATIONS

Search Report for PCT Application No. PCT/US2013/059072, dated Nov. 12, 2014.
Written Opinion for PCT Application No. PCT/US2013/059072, dated Nov. 12, 2014.
Search Report for Taiwanese Patent Application No. 102133685, dated Jan. 14, 2015.
Chemically Strengthened Glass, Wikipedia, Apr. 19, 2009, http://en/wikipedia.org/w/index.
php?title=Chemically_strengthened_glass&oldid=284794988.
Wikipedia: "Iphone 4", www.wikipedia.org, retrieved Oct. 31, 2011, 15 pgs.
"Toward Making Smart Phone Touch-Screens More Glare and Smudge Resistant", e! Science News, http://eciencenews.com/articles/2009/08/19toward.making.smart.phone.touch.screens.more.glare.and.smudge.resistant, Aug. 19, 2009, 1 pg.
Aben "Laboratory of Photoelasticity", Institute of Cybernetics at TTU, www.ioc.ee/res/photo.html, Oct. 5, 2000.
Forooghian et al., Investigative Ophthalmology & Visual Science; Oct. 2008, vol. 49, No. 10.
Saxer et al., "High-Speed Fiber-Based Polarization-sensitive optical coherence tomography of in vivo human skin", Optics Letters, vol. 25, No. 18, Sep. 15, 2000, pp. 1355-1357.
Ohkuma, "Development of a Manufacturing Process of a Thin, Lightweight LCD Cell", Department of Cell Process Development, IBM, Japan, Section 13.4.
Lee et al., "A Multi-Touch Three Dimensional Touch-Sensitive Tablet", Proceedings of CHI: ACM Conference on Human Factors in Computing Systems, Apr. 1985, pp. 21-25.
Rubine, "The Automatic Recognition of Gestures", CMU-CS-91-202, Submitted in Partial Fulfillment of the Requirements of the Degree of Doctor of Philosophy in Computer Science at Carnegie Mellon University, Dec. 1991, 285 pages.

(56) References Cited

OTHER PUBLICATIONS

Rubine, "Combining Gestures and Direct Manipulation", CHI'92, May 1992, pp. 659-660.
Westerman, "Hand Tracking, Finger Identification and Chrodic Manipulation of a Multi-Touch Surface", A Dissertation Submitted to the Faculty of the University of Delaware in Partial Fulfillment of the Requirements for the degree of Doctor of Philosophy in Electrical Engineering, Spring 1999, 364 pages.
Karlsson et al., "The Technology of Chemical Glass Strengthening—a review", Apr. 2010, Glass Technology, European Journal of Glass Science and Technology A., vol. 51, No. 2, pp. 41-54.

\* cited by examiner

EXPOSED GLASS ARTICLE WITH INNER RECESSED AREA FOR PORTABLE ELECTRONIC DEVICE HOUSING

CROSS-REFERENCE TO RELATED APPLICATION

This application claims priority to U.S. Provisional Patent Application No. 61/702,969, filed Sep. 19, 2012, entitled "EXPOSED GLASS ARTICLE WITH INNER RECESSED AREA FOR PORTABLE ELECTRONIC DEVICE HOUSING", which is hereby incorporated herein by reference.

BACKGROUND

Conventionally, a portable electronic device has a housing that encases the various electrical components of the portable electronic device. Often, the portable electronic device has a display arrangement that includes various layers. The various layers usually include at least a display technology layer that provides a display screen, and may additionally include a sensing arrangement (e.g., touch sensors or touch screen) and/or a cover window disposed over the display technology layer. The cover window can be a plastic or glass cover that provides a protective outer surface that protects the display arrangement. The cover window can form part of an outer surface for the housing of the portable electronic device. Conventionally, the cover window is partially covered with ink to provide masking of regions of the cover window not associated with the display screen. The cover window, for example, can be partially covered on an inner surface of the cover window to provide a masking effect so that internal components of the housing for the portable electronic device are not visible through the masked portion of the cover window. However, providing the masking on the inner surface often requires a non-trivial build-up of ink. For example, for a suitable visual appearance of the masking effect, a series of multiple layers of ink may be used. Unfortunately, however, such a stacking of layers of ink can impede the ability of the inner surface of the cover window to fit closely adjacent (e.g., directly adjacent) the display technology layer, which causes a decrease in effective optical performance for the display screen.

SUMMARY

Transparent articles for use as outer surfaces of electronic devices and methods therefor are disclosed. A transparent cover can be provided over a display of portable electronic device to provide a protective outer cover over the display. The transparent cover can include material to mark, mask or color a portion of the transparent cover, such portion thereupon becoming opaque. The material can be provided in a recessed portion of an inner surface of the transparent cover, such portion being a portion of the transparent cover that is not over a usable portion of the display. The electronic device can, for example, be a portable electronic device.

Embodiments of the invention can be implemented in numerous ways, including as a method, system, device, or apparatus. Several embodiments of the invention are discussed below.

As a method for producing a glass article having an opaque border region, one embodiment can, for example, include at least: obtaining a glass article for use as an outer surface for a portable electronic device; physically manipulating a peripheral region of a backside of the glass article; and applying at least one layer of material to the manipulated peripheral region of the backside of the glass article.

As a method for forming a plurality of glass articles for portable electronic devices, where each of the glass articles are configured to serve as a portion of an outer surface of a housing for the corresponding portable electronic device, one embodiment can, for example, include at least: obtaining a glass sheet suitable for providing multiple instances of glass articles for an outer surface of a housing for a portable electronic device; singulating the glass sheet to form individual instances of the glass articles; forming a recessed boundary region on an inner surface of at least a plurality of the individual instances of the glass articles; subsequently chemically strengthening the plurality of the individual instances of the glass articles; and applying ink to the recessed boundary region of the plurality of the individual instances of the glass articles.

As a method for producing a transparent article having an opaque border region, one embodiment can, for example, include at least: obtaining an article for use as an outer surface for a portable electronic device, the article including at least a center region and a border region; physically manipulating the border region of a backside of the article; and applying at least one layer of material to the manipulated border region of the backside of the article.

As a method for forming a plurality of glass articles for portable electronic devices, where each of the glass articles are configured to serve as a portion of an outer surface of a housing for the corresponding portable electronic device, one embodiment can, for example, can include at least: obtaining a glass sheet suitable for providing multiple instances of glass articles for an outer surface of a housing for a portable electronic device; forming a recessed boundary region on an inner surface of at least a plurality of the multiple instances of the glass articles; singulating the glass sheet to form individual instances of the glass articles; subsequently chemically strengthening a plurality of the individual instances of the glass articles; and applying ink to the recessed boundary region of the plurality of the individual instances of the glass articles.

As a portable electronic device, one embodiment can, for example, include at least an electronic device housing, a glass cover, and a touch screen assembly. The electronic device housing can includes a bottom surface and side surfaces. The glass cover can provide an outer surface for a portion of the electronic device housing, and the glass cover can include an inner surface having a recessed area and a non-recess area. The recessed area can include non-glass material. The touch screen assembly can have a top surface and a bottom surface. The touch screen assembly can be provided internal to the electronic device housing, and the top surface of the touch screen assembly can be adjacent to the inner surface of the glass cover.

As a portable electronic device, one embodiment can, for example, include at least an electronic device, a transparent cover and a touch screen assembly. The electronic device housing can include a bottom surface and side surfaces. The transparent cover can provide an outer surface for a portion of the electronic device housing. The transparent cover can include an outer surface that serves as the outer surface for the portion of the electronic device housing. The transparent cover also can include an inner surface having a recessed area and a non-recess area, with the recessed area including opaque material. The touch screen assembly can have a top surface and a bottom surface. The touch screen assembly can be provided internal to the electronic device housing, and the top surface of the touch screen assembly can be provided adjacent to the inner surface of the transparent cover.

Other aspects and advantages of embodiment of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF EMBODIMENTS OF THE INVENTION

Figure 1:
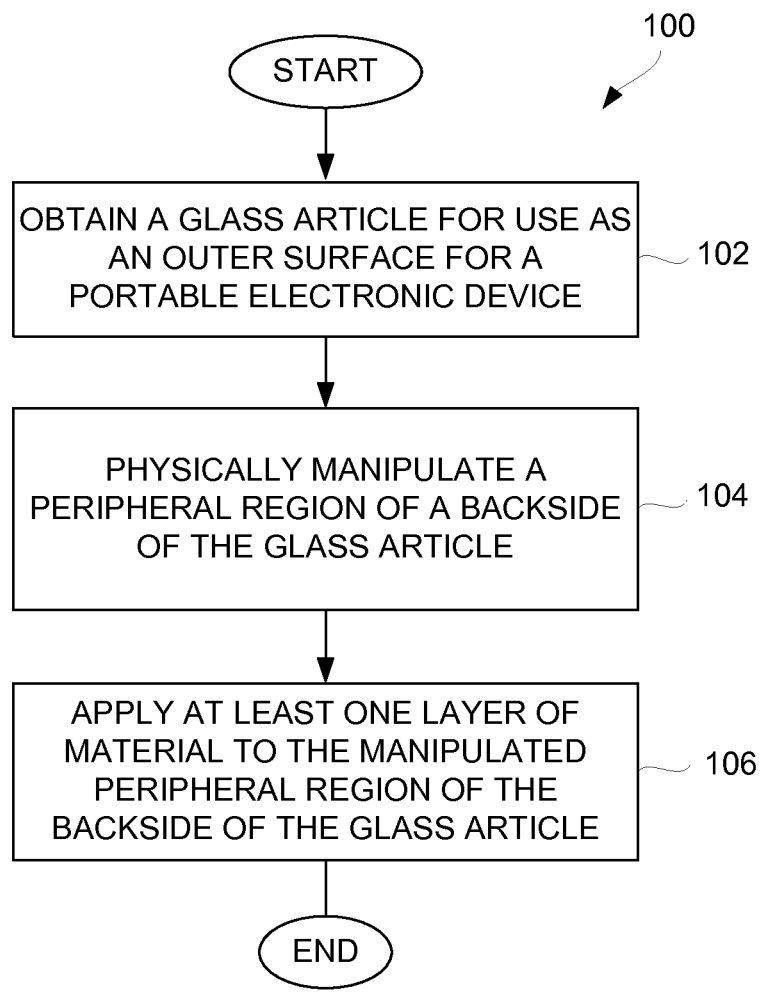
FIG. 1 is a flow diagram of glass article processing according to one embodiment.

Transparent articles for use as outer surfaces of electronic devices and methods therefor are disclosed. A transparent cover can be provided over a display of portable electronic device to provide a protective outer cover over the display. The transparent cover can include material to mark, mask or color a portion of the transparent cover, such portion thereupon becoming opaque. The material can be provided in a recessed portion of an inner surface of the transparent cover, such portion being a portion of the transparent cover that is not over a usable portion of the display. The electronic device can, for example, be a portable electronic device.

According to one aspect, an electronic device can have a housing structure that is configured to receive at least one glass cover. The glass cover serves to cover a display assembly provided within the electronic device. The glass cover can be secured to the housing structure so as to provide a user interfacing surface. The enclosure for the electronic device can be thin yet be sufficiently strong to be suitable for use in electronic devices, such as portable electronic devices.

Embodiments can relate to apparatus and methods for forming a housing having a thin glass member for an electronic device. In one example, the glass member may be an outer surface of an electronic device. The glass member may for example correspond to a glass cover that helps form part of a display area of an electronic device (i.e., situated in front of a display either as a separate part or integrated within the display). Alternatively or additionally, the glass member may form a part of the housing. For example, it may form an outer surface other than in the display area.

The apparatus and methods for providing thin glass articles for glass covers or displays (e.g., LCD displays) can be assembled in small form factor electronic devices such as handheld electronic devices (e.g., mobile phones, media players, personal digital assistants, remote controls, etc.). The glass can be thin in these small form factor embodiments, such as less than 3 mm, or more particularly between 0.5 and 2.5 mm, or even more particularly between 0.3 and 1.0 mm. The apparatus and methods can also be used for glass covers or displays for other devices including, but not limited to including, relatively larger form factor electronic devices (e.g., portable computers, tablet computers, displays, monitors, televisions, etc.). The glass can also be thin in these larger form factor embodiments, such as less than 5 mm, or more particularly between 0.5 and 3 mm, or even more particularly between 0.3 and 2.0 mm.

Embodiments are discussed below with reference to FIGS. 1-7. However, those skilled in the art will readily appreciate that the detailed description given herein with respect to these figures is for explanatory purposes as the invention extends beyond these limited embodiments.

The following detailed description is illustrative only, and is not intended to be in any way limiting. Other embodiments will readily suggest themselves to skilled persons having the benefit of this disclosure. Reference will now be made in detail to implementations as illustrated in the accompanying drawings. The same reference indicators will generally be used throughout the drawings and the following detailed description to refer to the same or like parts. It should be appreciated that the drawings are generally not drawn to scale, and at least some features of the drawings have been exaggerated for ease of illustration.

Embodiments are described herein in the context of a housing for an electronic device. The housing can make use of an outer member, which can be a transparent article. In one embodiment, the outer member can be formed of glass, which can also be referred to as a cover glass. The outer member can be secured with respect to other portions of the housing for the electronic device. The electronic device can be portable and in some cases handheld.

FIG. 1 is a flow diagram of glass article processing 100 according to one embodiment. The glass article processing 100 can serve to process a piece of glass to produce a glass article suitable for use as providing an outer surface for a portable electronic device. The outer surface of a portable electronic device can, for example, provide a user interfacing surface that provides access to view a display and/or to receive user touch inputs. The glass article can, for example, be referred to as a cover glass for a portable electronic device.

The glass article processing 100 can obtain 102 a glass article for use as an outer surface for a portable electronic device. The glass article is typically a thin piece of glass, such as having a thickness between 0.2-2.0 mm. After the glass article has been obtained 102, a peripheral region of a backside of the glass article can be physically manipulated 104. In one embodiment, the physical manipulation 104 can serve to produce a recessed area at the backside of the glass article. The physical manipulation 104 can be implemented by any of a number of one or more techniques, including grinding, cutting, forging, etc.

After the peripheral region of the backside of the glass article has been physically manipulated 104, at least one layer of material can be applied 106 to the manipulated peripheral region of the backside of the glass article. As an example, the at least one layer of material can include one or more layers of ink or paint that are applied to the manipulated peripheral region. In one embodiment, the at least one layer of material being applied 106 to the manipulated peripheral region serves to render the otherwise transparent glass article opaque at the manipulated peripheral region. Advantageously, in one embodiment, the one or more layers of ink or paint applied 106 to the manipulated peripheral region can be such that the combined height of the one or more layers of material is less than or equal to the depth of the recessed area produced by the physical manipulation 104. Advantageously, when the glass article is assembled to a housing for the portable electronic device, the backside of the glass article is able to abut against (e.g., directly contact) a display assembly within the housing without interference from the layers of material.

Figure 2A:
FIGS. 2A-2C are diagrams illustrating manufacture of a glass article according to one embodiment.
Figure 2B:
Figure 2C:
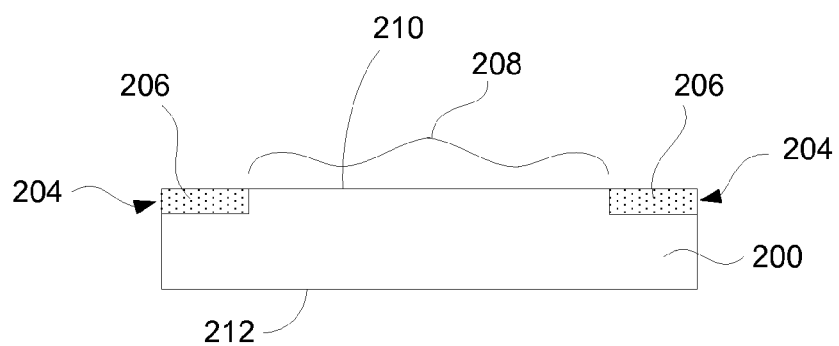

FIGS. 2A-2C are diagrams illustrating manufacture of a glass article according to one embodiment. The manufacture of a glass article illustrated in FIGS. 2A-2C can, for example, represent processing stages of the glass article processing 100 illustrated in FIG. 1.

FIG. 2A illustrates a cross-section view of a glass article 200 according to one embodiment. The glass article 200 can, for example, represent a cover glass for an outer surface, such as a user interfacing surface, for a portable electronic device.

FIG. 2B illustrates a cross-sectional view of the glass article 200 after the glass article 200 has been physically manipulated at a peripheral region 202 to produce a recessed region 204. In this embodiment, the recessed region 204 is at the peripheral region 202, and thus can be referred to as a recessed peripheral region 204 (recessed border region). However, it should be understood that in other embodiments the recessed region 202 need not be at the peripheral region 202.

FIG. 2C illustrates a cross-sectional view of the glass article 200 after further processing has been performed. More particularly, the glass article 200 illustrated in FIG. 2C further includes material 206 applied to the recessed region 204. Here, the material 206 can include one or more layers of material, where the material in each of the layers can be the same or different. For example, the material can pertain to ink or paint and the different layers, if multiple layers are provided, can pertain to different colors of ink or paint. The use of multiple layers of material can yield a desired cosmetic and/or masking effect. Although the thickness of the material 206 can vary depending on specific implementation, in one embodiment, the thickness of the material 206 is within the range of about 8-90 micrometers.

Typically, as shown in FIG. 2C, the material 206 is only provided at the recessed region 204, which in this embodiment pertains to the recessed region 204 at the peripheral region 202. As such, a central portion 208 of the glass article 200 is free of the material 206. The glass article 200, as shown in FIG. 2C, also includes an inner surface 210 and an outer surface 212. The inner surface 210 faces internal components to the portable electronic device, such as a display and/or touch screen assembly for the portable electronic device. Typically, the inner surface 210 is provided closely adjacent to the display and/or touch screen assembly for the portable electronic device. For example, the inner surface 210 would abut, or be provided directly adjacent, the display and/or the touch screen assembly for the portable electronic device without interference from the material 206 provided at the recessed region 204. The outer surface 212 for the glass article 200 and serve as the outer surface for the portable electronic device, such as a front surface for the portable electronic device through which the display and/or touch screen assembly is visible to a user.

Figure 3:
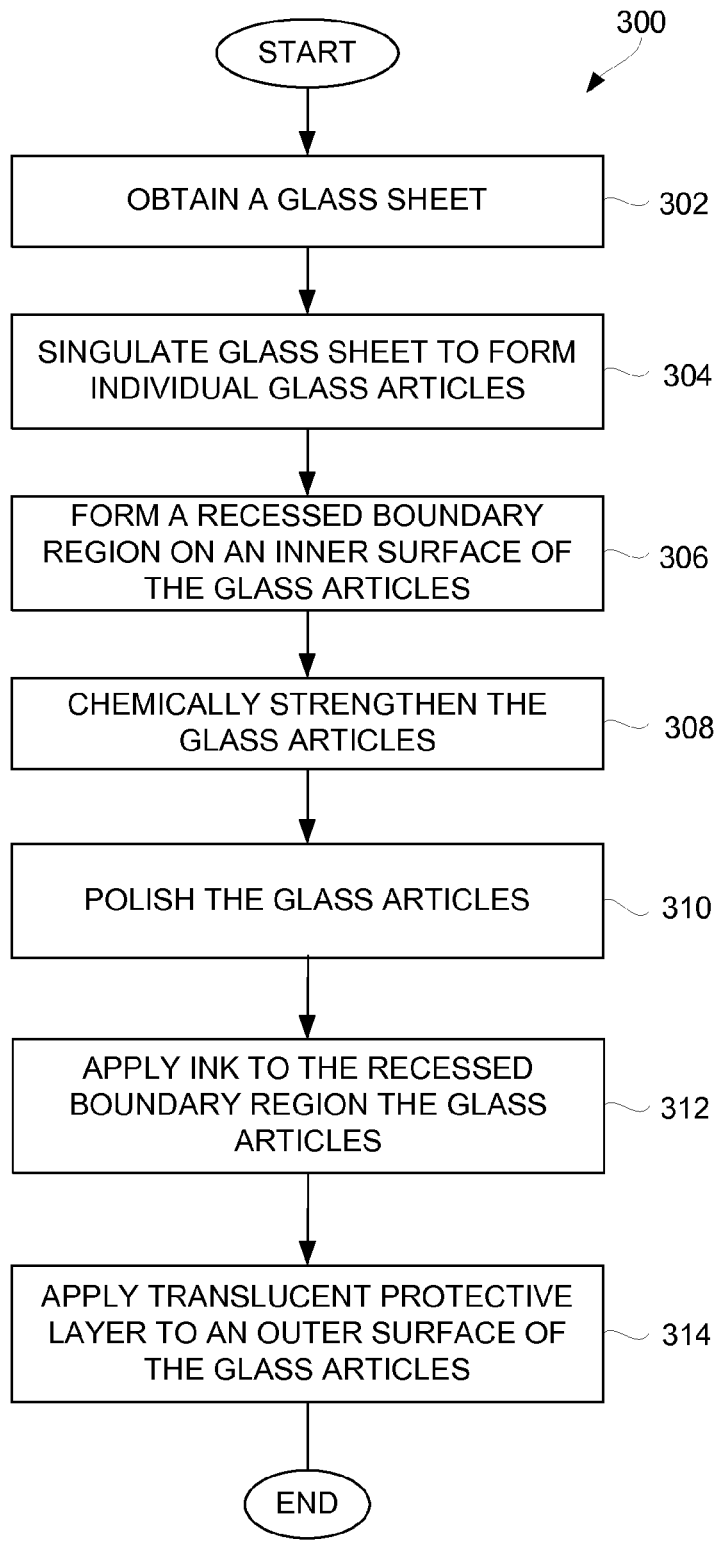
FIG. 3 is a flow diagram of glass article processing according to one embodiment.

FIG. 3 is a flow diagram of glass article processing 300 according to one embodiment. The glass article processing 300 can serve to process a sheet of glass to produce a plurality of glass articles, each of which is suitable for use as an outer surface for a portable electronic device. The outer surface of a portable electronic device can, for example, provide a user interfacing surface that provides access to view a display and/or to receive user touch inputs. The glass article can, for example, be referred to as a cover glass for a portable electronic device.

The glass article processing 300 can obtain 302 a glass sheet. The glass sheet can be processed to singulate 304 the glass sheet to form a plurality of individual glass articles. Each of the individual glass articles are suitable for use as an outer surface for a portable electronic device. After the glass sheet is singulated 304 to form the individual glass articles, each of the individual glass articles can be individually processed as described below.

The glass article processing 300 can form 306 a recessed boundary region on an inner surface of the glass articles. The formation 306 of the recessed boundary region can be implemented by any of a number of one or more techniques, including grinding, cutting, forging, etc.

Then, the glass articles can be chemically strengthened 308. For example, the chemical strengthening can result from placing the glass articles into ion exchange bath (e.g., a potassium bath) for a duration of time. Additional details on chemical strengthening are contained in: (i) U.S. patent application Ser. No. 12/895,823, filed Sep. 30, 2010 and entitled "ENHANCED STRENGTHENING OF GLASS", which is herein incorporated by reference; (ii) U.S. patent application Ser. No. 12/895,372, filed Sep. 30, 2010 and entitled "TECHNIQUES FOR STRENGTHENING GLASS COVERS FOR PORTABLE ELECTRONIC DEVICES", which is herein incorporated by reference; (iii) U.S. patent application Ser. No. 12/895,393, filed Sep. 30, 2010 and entitled "TECHNIQUES FOR STRENGTHENING GLASS COVERS FOR PORTABLE ELECTRONIC DEVICES", which is herein incorporated by reference; (iv) U.S. patent application Ser. No. 13/121,385, filed Mar. 28, 2011 and entitled "TECHNIQUES FOR STRENGTHENING GLASS COVERS FOR PORTABLE ELECTRONIC DEVICES", which is herein incorporated by reference; and (v) U.S. patent application Ser. No. 12/847,926, filed Jul. 30, 2010 and entitled "ELECTRONIC DEVICE HAVING SELECTIVELY STRENGTHENING GLASS COVER GLASS", which is herein incorporated by reference.

Following the chemical strengthening 308, the glass articles can be polished 310. In addition, ink (or other material) can be applied 312 to the recessed boundary region of the glass articles. The ink being applied 312 is utilized to make the otherwise transparent glass article opaque at the recessed boundary region. Finally, a translucent protective layer can be applied 314 to an outer surface of the glass articles. Following the application 314 of the translucent protective layer, the glass article processing 300 can end.

FIGS. 4A-4G are diagrams representing various stages of processing to form glass articles according to one embodiment. The manufacture of a glass article illustrated in FIGS. 4A-4G can, for example, represent processing stages of the glass article processing 300 illustrated in FIG. 3.

Figure 4A:
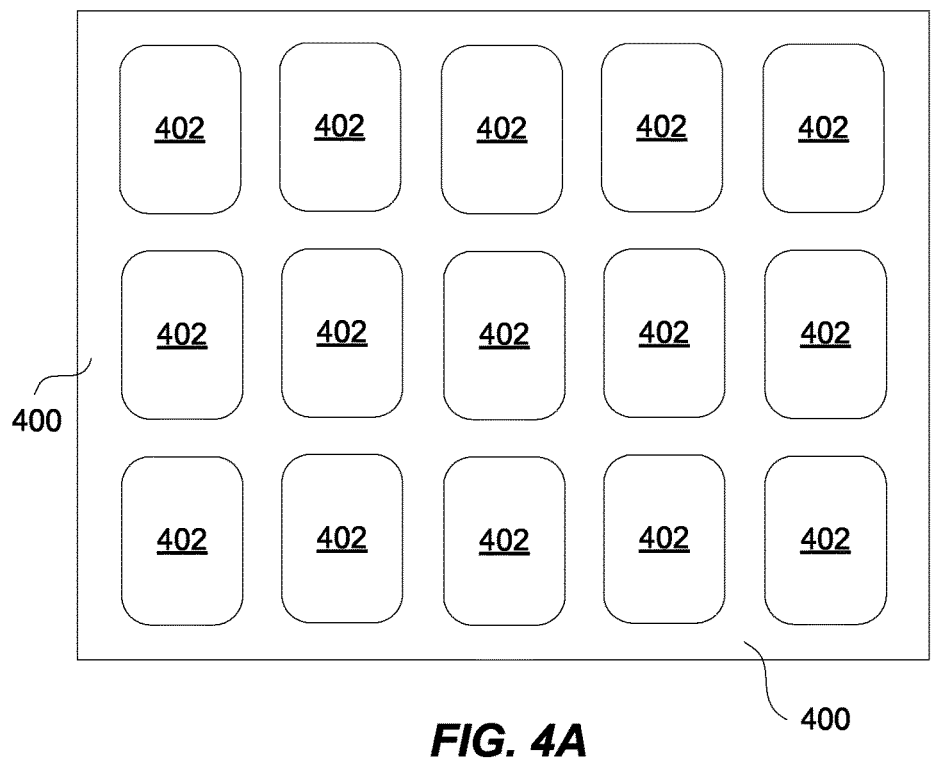
FIGS. 4A-4G are diagrams representing various stages of processing to form glass articles according to one embodiment.

FIG. 4A illustrates a glass sheet 400 that includes sufficient area to produce a plurality of initial glass articles. More particularly, the glass sheet obtained has a relatively thin thickness, such as between 0.2 and 2.0 mm. The glass sheet can then be processed to singulate the glass sheet 400 into individual glass articles, namely, the initial glass articles. The singulation can result from cutting the glass sheet using any of a number of techniques, such as scribe and break, laser cutting, water cutting, blade cutting and the like.

Figure 4B:
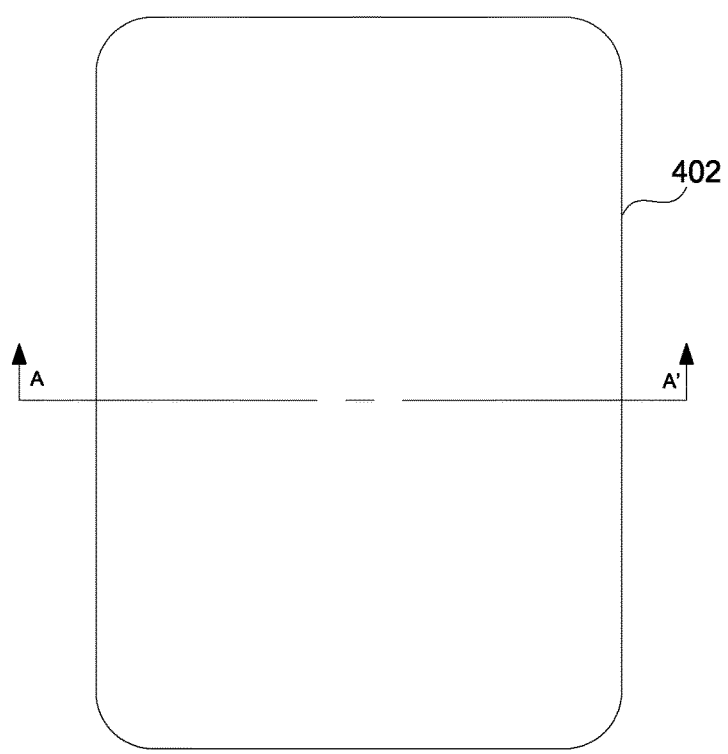

FIG. 4B illustrates a front view of one of the initial glass articles that are produced from the glass sheet 400. Although the various illustrations in the drawings are often not to scale, it should be understood that the sheet 400 illustrated in FIG. 4A is shown in a substantially scaled down version, and that the initial glass article 402 shown in FIG. 4B is more representative of the scale of the initial glass article 402. Even so, it should be understood that the size of the initial glass article 402 would depend upon a particular device for which is used.

Figure 4C:

FIG. 4C illustrates a cross-sectional view of the initial glass article 402 shown in FIG. 4B with respect to the reference line A-A'.

Figure 4D:

FIG. 4D illustrates a cross-sectional view of the initial glass article 402 after undergoing additional processing at a peripheral region 404 (or border region) to form a recessed region 406. The recessed region 406 is formed into the glass article 402. As shown, the recessed region 406 is formed at one side of the glass article 402, which is typically a backside of the glass article 402. The backside of the glass article 402 is typically to be provided adjacent to internal electrical components (e.g., display assembly) within a housing for a portable electronic device.

Figure 4E:

FIG. 4E illustrates a cross-sectional view of the initial glass article after undergoing chemical strengthening. Here, following the formation of the recessed region 406, the additional processing concerns chemical strengthening 408 of the glass article 402 having the recessed region 406. Chemical strengthening is known in the art and typically involves placing the glass article 402 into an ion exchange bath (e.g., a potassium bath) for a duration of time. Additional details on chemical strengthening are contained in: (i) U.S. patent application Ser. No. 12/895,823, filed Sep. 30, 2010 and entitled "ENHANCED STRENGTHENING OF GLASS", which is herein incorporated by reference; (ii) U.S. patent application Ser. No. 12/895,372, filed Sep. 30, 2010 and entitled "TECHNIQUES FOR STRENGTHENING GLASS COVERS FOR PORTABLE ELECTRONIC DEVICES", which is herein incorporated by reference; (iii) U.S. patent application Ser. No. 12/895,393, filed Sep. 30, 2010 and entitled "TECHNIQUES FOR STRENGTHENING GLASS COVERS FOR PORTABLE ELECTRONIC DEVICES", which is herein incorporated by reference; (iv) U.S. patent application Ser. No. 13/121,385, filed Mar. 28, 2011 and entitled "TECHNIQUES FOR STRENGTHENING GLASS COVERS FOR PORTABLE ELECTRONIC DEVICES", which is herein incorporated by reference; and (v) U.S. patent application Ser. No. 12/847,926, filed Jul. 30, 2010 and entitled "ELECTRONIC DEVICE HAVING SELECTIVELY STRENGTHENING GLASS COVER GLASS", which is herein incorporated by reference.

Figure 4F:

FIG. 4F illustrates a cross-sectional view of the initial glass article after material 410, such as ink or paint, is placed (e.g., deposited) within the recessed region 406 of the glass article 402. The material 410 can be deposited in one or more layers, and each of the layers can consist of the same or different material. Although the thickness of the material 410 can vary depending on specific implementation, in one embodiment, the thickness of the material 410 is within the range of about 8-90 micrometers.

Figure 4G:

FIG. 4G illustrates a cross-sectional view of the glass article after further processing causes a layer of protective coating 412 to be deposited on an outer facing surface of the glass article 402. For example, the layer of protective coating 412 can be an anti-smudge coating, such as an oleophobic coating.

Figure 4H:
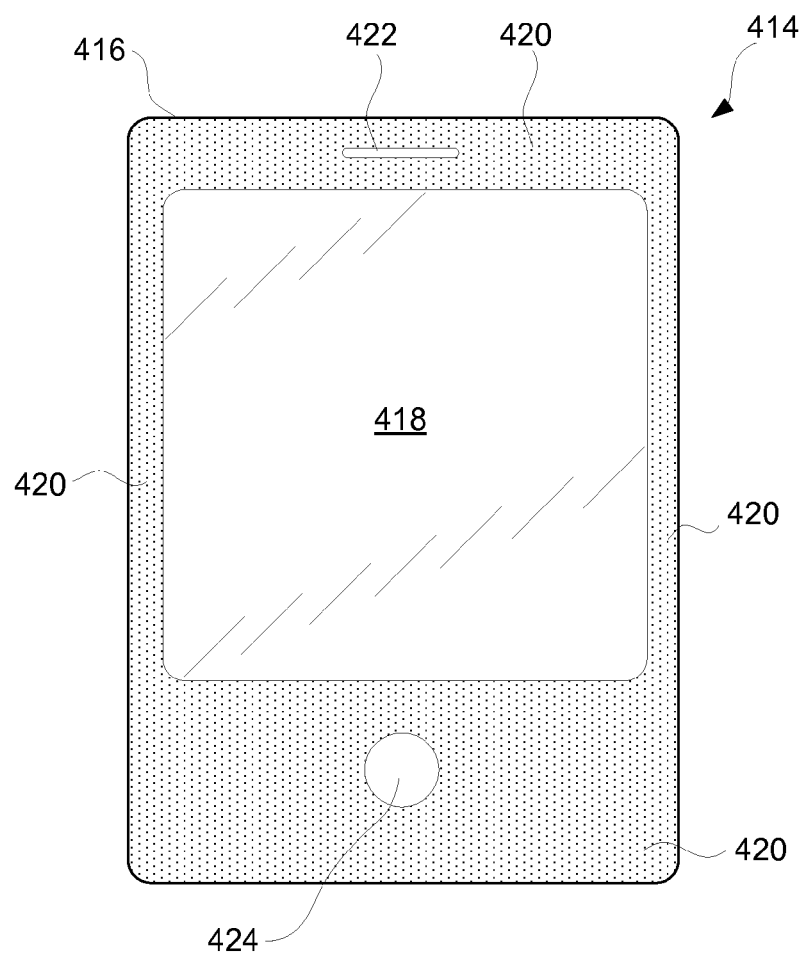
FIG. 4H illustrates a front view for a resulting glass article according to one embodiment.

FIG. 4H illustrates a front view for a resulting glass article 414 according to one embodiment. The resulting glass article 414 can result from the glass article processing 300 illustrated in FIG. 3 and/or the processing stages illustrated in FIGS. 4A-4G. In this exemplary embodiment shown in FIG. 4H, the resulting glass article 414 has a glass body 416. The glass body 416 includes a translucent central region 418 and an opaque peripheral region 420. In this embodiment, the opaque peripheral region 420 results from the material 410 provided in the recessed region 406. However, since the central region 418 does not receive (or at least does not retain) the material 410, the central region 418 remains transparent. The resulting glass article 414 can include an opening 422 for a speaker provided in the housing for the corresponding portable electronic device. The resulting glass article 414 can also include an opening 424 for a microphone provided in the housing for the corresponding portable electronic device.

Figure 5:
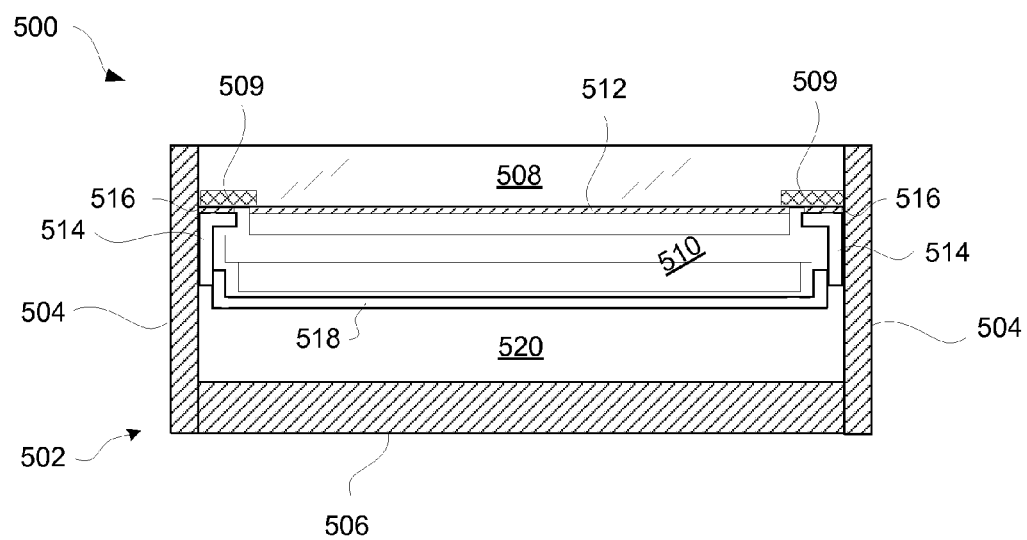
FIG. 5 is a cross-sectional view of an electronic device housing according to one embodiment.

FIG. 5 is a cross-sectional view of an electronic device housing 500 according to one embodiment. The electronic device housing 500 includes a housing 502. The housing 502 includes side members 504 and a bottom member 506. A transparent member 508 can be provided as a top surface for the electronic device housing 500. For example, the transparent member 508 can be a glass member, often referred to as a glass window or cover glass. The transparent member 508 can, for example, be produced by the methods and apparatus discussed above. Although the transparent member 508 is often formed of glass, in an alternative embodiment, the transparent member 508 can be formed of a polymer-based member (e.g., plastic). The transparent member 508 can also include an opaque region 509. The opaque region 509 shown in FIG. 5A is at a peripheral region of an inner surface of the transparent member 509. The opaque region 509 can provide a cosmetic or masking effect for the components or structures within the electronic device housing 500 that are located at the peripheral portion of the electronic device housing 500. The opaque region 509 can be formed by any of various methods, including those discussed above.

The electronic device housing 500 can include a touch screen assembly 510. The touch screen assembly 510 can include a plurality of touch and display components that are laminated together. The touch and display components can, for example, include a display technology layer (e.g., LCD panel), a sensing layer (e.g., touch sensors) and/or a backlight layer. The touch screen assembly 510 is secured within the electronic device housing 500. In one embodiment, the touch screen assembly 510 can be secured to a bottom surface of the transparent member 508 by a layer of adhesive 512 (e.g., clear adhesive). Alternatively or additionally, in another embodiment, the touch screen assembly 510 can be secured to the side members 504 of the electronic device housing 500 via a brackets, adhesive or other means. For example, the electronic device housing 500 can include mounting brackets 514 that are secured to not only the side members 504 of the electronic device housing 500 (by any of a variety of techniques, including welding, screws, snaps or adhesive) but also the peripheral portion of the bottom surface of the transparent member 508 with a layer of adhesive 516. The mounting brackets 514 can be formed of metal (e.g., aluminum, stainless steel, titanium copper) or a polymer. The mounting brackets 514 can be thin such as on the order of 0.1-0.6 mm. In one embodiment, the mounting brackets 514 can include a pair of rails secured to opposite sides of the peripheral portion of the bottom surface of the transparent member 508 with the layer of adhesive 516.

The electronic device housing 500 can also include a frame 518. The frame 518 is provided within the electronic device housing 500 and provided adjacent to a bottom surface of the touch screen assembly 510. In one embodiment, there is a small gap between the frame 518 and the bottom surface on the touch screen assembly 510. The frame 518 can serve to provide stiffness to the electronic device housing 500 and can also provide a surface that protects the touch screen assembly 510. The frame 518 can be secured to the mounting brackets 514 or the side members 504 by any of a variety of techniques (e.g., welding, screws, snaps, adhesive).

An internal space 520 is provided internal to the electronic device housing 500 whereby various electrical components (e.g., including processor, memory, battery and circuit board) can be attached, affixed or placed so as to provide electronic operations for the electronic device.

In general, the various members, parts or assemblies of the electronic device housing 500 can be formed of any of a variety of materials, e.g., glass, polymers or metal. In one embodiment, the transparent member 508 is glass, the mounting brackets 514 and the frame 518 are formed from metal or polymer (e.g., plastic), and the housing 502 is formed from glass, polymer (e.g., plastic) or metal.

Figure 6:
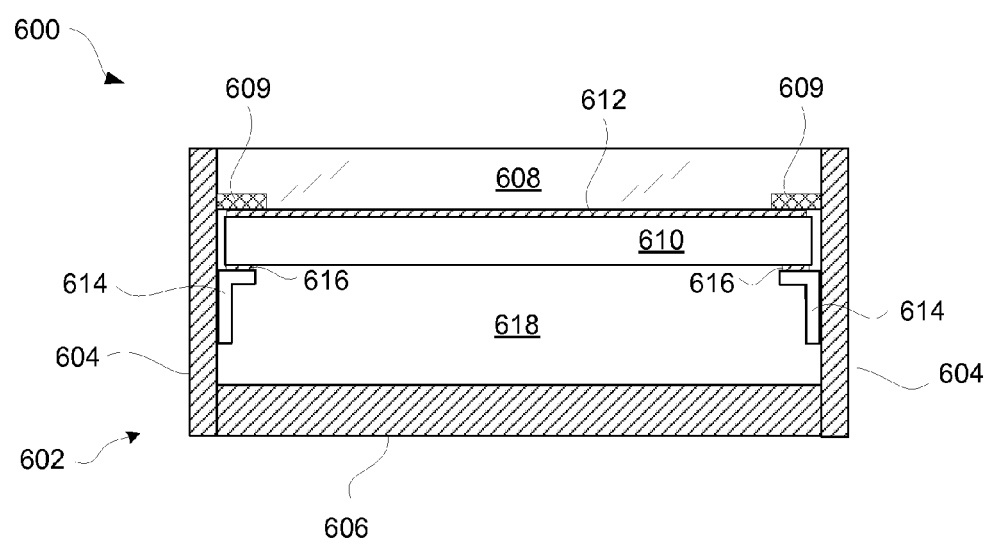
FIG. 6 is a cross-sectional view of an electronic device housing according to one embodiment.

FIG. 6 is a cross-sectional view of an electronic device housing 600 according to one embodiment. The electronic device housing 600 includes a housing 602. The housing 602 includes a side member 604 and a bottom member 606. A transparent member 608 can be provided as a top surface for the electronic device housing 600. For example, the transparent member 608 can be a glass member, often referred to as a glass window or cover glass. The transparent member 608 can, for example, be produced by the methods and apparatus discussed above. Although the transparent member 608 is often formed of glass, in an alternative embodiment, the transparent member 608 can be formed of a polymer-based member (e.g., plastic). The transparent member 608 can also include an opaque region 609. The opaque region 609 shown in FIG. 6A is at a peripheral region of an inner surface of the transparent member 609. The opaque region 609 can provide a cosmetic or masking effect for the components or structures within the electronic device housing 600 that are located at the peripheral portion of the electronic device housing 600. The opaque region 509 can be formed by any of various methods, including those discussed above.

The electronic device housing 600 can include a display screen assembly 610. The display screen assembly 610 can be secured to a bottom surface of the transparent member 608 by a layer of adhesive 612 (e.g., clear adhesive). The display screen assembly 610 can include one or a plurality of distinct technology components that can be laminated together. In one implementation, the technology components can, for example, include a sensing layer (e.g., touch sensors), a display technology layer (e.g., LCD panel) and/or a backlight layer. In another implementation, the technology components can, for example, include an organic light emitting diode (OLED) panel with or without a sensing layer (e.g., touch sensors).

The touch screen assembly 610 is secured within the electronic device housing 600. In one embodiment, the touch screen assembly 610 can be secured to a bottom surface of the transparent member 608 by a layer of adhesive 612 (e.g., clear adhesive). Additionally, the electronic device housing 600 can include mounting brackets 614 that are secured to the peripheral portion of the bottom surface of the display screen assembly 610 with a layer of adhesive 616. The mounting brackets 614 can be formed of metal (e.g., aluminum, stainless steel, titanium copper) or a polymer. The mounting brackets 614 can be thin such as on the order of 0.1-0.6 mm. In one embodiment, the mounting brackets 614 can include a pair of rails secured to opposite sides of the peripheral portion of the bottom surface of the display screen assembly 610 with the layer of adhesive 616.

An internal space 618 is provided internal to the electronic device housing 600 whereby various electrical components (e.g., including processor, memory, battery and circuit board) can be attached, affixed or placed so as to provide electronic operations for the electronic device.

In general, the various members, parts or assemblies of the electronic device housing 600 can be formed of any of a variety of materials, e.g., glass, polymers or metal. In one embodiment, the transparent member 608 is glass, the mounting brackets 614 are formed from metal or polymer (e.g., plastic), and the housing 602 is formed from glass, polymer (e.g., plastic) or metal.

Figure 7:
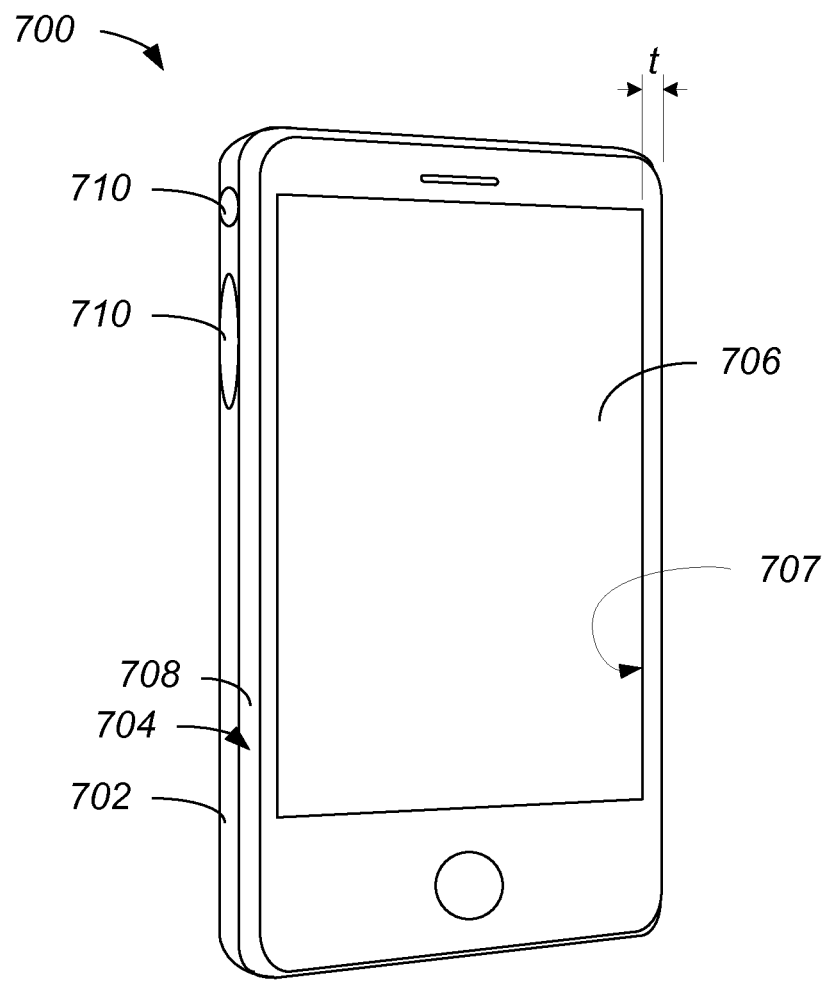
FIG. 7 is a perspective diagram of a handheld electronic device according to one embodiment.

FIG. 7 is a perspective diagram of a handheld electronic device 700 according to one embodiment. The handheld electronic device 700 may include a housing 702, e.g., a periphery member, that is arranged to at least partially surround the periphery of the handheld electronic device 700 to form some or all of the outer-most side, top and bottom surfaces of the handheld electronic device 700. The handheld electronic device 700 also includes a cover piece 704 that is arranged to be substantially coupled to housing 702 to effectively enclose an inner volume of the handheld electronic device 700. The cover piece 704 may include a glass member 706, e.g., cover glass, provided over a display of the handheld electronic device 700. In one embodiment, the cover piece 704 can include a protective frame 708 in which glass member 706 is held. The glass member 706 can serve as the top surface of the housing 702. A display region 707 of the glass member 706 is that portion of the glass member 706 that corresponds to the display (e.g., active display region).

The housing 702 may have any suitable shape, including, for example, one or more elements that may be combined to form a rectangular structure. The housing 702 may at least partially enclose an inner volume in which electronic device components may be assembled and retained. The shape of housing 702 may substantially define boundaries of the inner volume, and may be determined based upon the size and type of components placed within the inner volume.

The housing 702 may have any suitable size, and the size may be determined based on any suitable criteria. Suitable criteria may include, but are not limited to including, aesthetics or industrial design, structural considerations, components required for a desired functionality, and/or product design. The housing 702 may have any suitable cross-section, including for example a variable cross-section or a constant cross-section. In some embodiments, the cross-section may be selected based on desired structural properties for housing 702. For example, the cross-section of housing 702 may be substantially rectangular, such that the height of housing 702 is substantially larger than the width of housing 702. Such a cross-sectional shape may provide structural stiffness in compression and tension, as well as in bending. In some embodiments, the dimensions of housing 702 cross-section may be determined relative to the dimensions of the components contained by housing 702.

In some embodiments, housing 702 may include features 710. The features 710 may generally include one or more openings, knobs, extensions, flanges, chamfers, or other features for receiving components or elements of the device. The features 710 of the housing 702 extend from any surface of housing 702, including for example from internal surfaces, e.g., to retain internal components or component layers, or from external surfaces. In particular, the housing 702 may include a slot or opening (not shown) for receiving a card or tray within the handheld electronic device 700. The housing 702 may also include a connector opening (not shown), e.g., for a 30-pin connector, through which a connector may engage one or more conductive pins of the handheld electronic device 700. Other features 710 included on the housing 702 may include, but are not limited to, an opening for providing audio to a user, an opening for receiving audio from a user, an opening for a connector (e.g., audio connector or power supply connector), and/or features for retaining and enabling a button such as a volume control or silencing switch.

Although various embodiments discussed herein include a touch screen assembly, various other embodiments may not include touch screen capabilities. In such other embodiments, a display assembly would be used in place of the touch screen assembly. The display assembly includes at least a display technology layer. The display assembly can also include a back light component.

In general, the steps associated with the methods of the present invention may vary widely. Steps may be added, removed, altered, combined, and reordered without departing from the spirit or the scope of the present invention.

The techniques describe herein may be applied to glass surfaces used by any of a variety of electronic devices including but not limited handheld electronic devices, portable electronic devices and substantially stationary electronic devices. Examples of these include any known consumer electronic device that includes a display. By way of example, and not by way of limitation, the electronic device may correspond to media players, mobile phones (e.g., cellular phones), PDAs, remote controls, notebooks, tablet PCs, monitors, all in one computers and the like.

The various aspects, features, embodiments or implementations of the invention described above can be used alone or in various combinations.

Although only a few embodiments of the invention have been described, it should be understood that the invention may be embodied in many other specific forms without departing from the spirit or the scope of the present invention. By way of example, the steps associated with the methods of the invention may vary widely. Steps may be added, removed, altered, combined, and reordered without departing from the spirit of the scope of the invention. Similarly, while operations are depicted in the drawings in a particular order, this should not be understood as requiring that such operations be performed in the particular order shown or in sequential order, or that all illustrated operations be performed, to achieve desirable results.

While this specification contains many specifics, these should not be construed as limitations on the scope of the disclosure or of what may be claimed, but rather as descriptions of features specific to particular embodiment of the disclosure. Certain features that are described in the context of separate embodiments can also be implemented in combination. Conversely, various features that are described in the context of a single embodiment can also be implemented in multiple embodiments separately or in any suitable subcombination. Moreover, although features may be described above as acting in certain combinations, one or more features from a claimed combination can in some cases be excised from the combination, and the claimed combination may be directed to a subcombination or variation of a subcombination.

While this invention has been described in terms of several embodiments, there are alterations, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A method for producing a glass article having an opaque border region, the method comprising:
    obtaining a glass article for use as a cover for a portable electronic device;
    removing glass from a backside of the glass article to form a peripheral mounting interface including at least one peripheral mounting region having a thickness less than a thickness of a central region;
    following the removal of the glass, applying at least one layer of material to the peripheral mounting region to form a surface that is flush with or recessed relative to a surface of the central region, thereby forming an attachment surface defined by the at least one layer of material;
    affixing the central region and at least a portion of the attachment surface to a front surface of a touch screen display assembly, thereby securing the glass article to the touch screen display assembly; and
    assembling the touch screen display assembly and the glass article with a housing such that a front side of the glass article opposite the backside faces away from the housing and is completely exposed.

2. The method as recited in claim 1, wherein;
    the glass article is a cover glass for the touch screen display assembly of the portable electronic device; and
    an entirety of the front surface of the touch screen display assembly is attached to the glass article.

3. The method as recited in claim 1, wherein:
    the glass article is substantially transparent; and
    the at least one layer of material at the peripheral mounting region of the backside of the glass sheet renders the peripheral mounting region of the glass sheet opaque.

4. The method as recited in claim 1, wherein:
    the glass article is clear; and
    the at least one layer of material applied at the peripheral mounting region of the backside of the glass sheet renders the peripheral mounting region of the backside of the glass sheet colored.

5. The method as recited in claim 1, wherein the at least one layer of material comprises at least one layer of colored ink or paint.

6. The method as recited in claim 1, wherein the applying of the at least one layer of material to the peripheral mounting region of the backside of the glass article comprises:
    applying a plurality of layers of material to the peripheral mounting region of the backside of the glass article to form a layered stack of material.

7. The method as recited in claim 6, wherein the layered stack of material includes at least one layer of a first material, and at least one layer of second material.

8. The method as recited in claim 6, wherein the layered stack of material includes at least one layer of a first material having a first color, and at least one layer of a second material having a second color different from the first color.

9. A method for forming a plurality of glass articles for portable electronic devices, each of the glass articles being configured to serve as a portion of an outer surface of a housing for the corresponding portable electronic device, the method comprising:
 obtaining a glass sheet;
 singulating the glass sheet to form individual instances of the glass articles;
 for a glass article of the individual instances:
  forming a recessed boundary region into a peripheral mounting interface on a back side of the glass article instances of the glass articles, the recessed boundary region being recessed relative to a center region of the glass article;
  subsequent to forming the recessed boundary, chemically strengthening the glass article;
  applying ink to the recessed boundary region of the glass article, such that a surface of the ink within the recessed boundary region is flush with or recessed relative to a surface of the center region; and
  adhering the center region of the glass article and at least part of the ink directly to a front surface of a touch screen display assembly such that the back side of the glass article faces the touch screen display assembly and a front side of the glass article opposite and substantially parallel to the back side is completely exposed.

10. The method as recited in claim 9, wherein the method further comprises:
 polishing, subsequent to the chemical strengthening, the glass article.

11. The method as recited in claim 9, wherein the method further comprises:
 applying, subsequent to the chemical strengthening, a translucent protective coating to the front side of the glass article.

12. The method as recited in claim 9, wherein the applying of the ink to the recessed boundary region substantially fills the recessed boundary region with the ink.

13. The method as recited in claim 9, wherein, the adhering comprises adhering the center region and the ink to the front surface of the touch screen display assembly with a clear adhesive, such that the clear adhesive is the only component between the back side of the glass article and the front surface of the touch screen display assembly.

14. The method as recited in claim 9, wherein the applying of the ink to the recessed boundary region comprises:
 applying ink to the recessed boundary region but not the center region or an edge surface of the glass article.

15. The method as recited in claim 9, wherein the applying of the ink to the recessed boundary region comprises:
 applying ink to the recessed boundary region and to the center region of the glass article; and
 removing the ink that has been applied to the center region.

16. The method as recited in claim 9, wherein the applying of the ink to the recessed boundary region comprises:
 applying a film on the center region but not the recessed boundary region of the glass article;
 applying the ink to the recessed boundary region and to the center region of the glass article, the ink being applied to the center region is applied to the film; and
 subsequent to applying the ink, removing the film from the center region, thereby removing the ink that has been applied to the center region.

17. A method for producing a transparent article having an opaque border region, the method comprising:
 obtaining an article for use as a cover defining an outer surface for a portable electronic device, the article including at least a center region and a peripheral mounting interface on a back side of the article and at least partially surrounding the center region;
 removing glass from the peripheral mounting interface of the article;
 applying at least one layer of material to a portion of the peripheral mounting interface where the glass was removed such that a thickness of article at the portion of the peripheral mounting interface with the at least one layer of material is equal to or less than a thickness of the article at the center region;
 applying an adhesive directly to the at least one layer of material and the center region;
 affixing the back side of the article to a front surface of a touch screen display assembly; and
 assembling the article and the touch screen display assembly with a housing of the portable electronic device such that the entire front side of the cover parallel to the back side is completely exposed and defines a front surface of the electronic device.

18. The method as recited in claim 17, wherein the at least one layer of material comprises at least one layer of colored ink or paint.

19. A method for forming a plurality of glass articles for portable electronic devices, each of the glass articles being configured to serve as a portion of an outer surface of a housing for the corresponding portable electronic device, the method comprising:
 obtaining a glass sheet;
 singulating the glass sheet to form individual instances of the glass articles;
 subsequent to singulating the glass sheet, chemically strengthening a plurality of the individual instances of the glass articles;
 for a glass article of the plurality of glass articles:
  applying ink to a recessed boundary region of a back side of the glass article such that a top surface of the ink is substantially coplanar with or recessed relative to a surface of a center region of the back side of the glass article, the ink and the recessed boundary region defining at least part of a peripheral mounting interface; and
  coupling the peripheral mounting interface and the center region of the glass article to a front surface of a touch screen assembly such that the back side of the glass article faces the touch screen assembly and a front side of the glass article opposite the back side is completely exposed and defines an exterior surface of an electronic device.

20. The method as recited in claim 19, wherein the method further comprises:
 polishing, subsequent to the chemical strengthening, the plurality of the individual instances.

21. The method as recited in claim 19, wherein the method further comprises:
 applying, subsequent to the chemical strengthening, a translucent protective coating to outer surfaces of the glass article.

22. The method as recited in claim 19, wherein the applying of the ink to the recessed boundary region substantially fills the recessed boundary region with the ink.

23. The method as recited in claim 19, wherein a top surface of the ink within the recessed boundary region of the glass article is recessed relative to the center region of the glass article.

24. The method as recited in claim 19, wherein the applying of the ink to the recessed boundary region of the plurality of the individual instances of the glass article comprises:
applying ink to the recessed boundary region but not the center region of the glass article.

25. The method as recited in claim 19, wherein the applying of the ink to the recessed boundary region of the glass article comprises:
applying ink to the recessed boundary region and to the center region of the glass article; and
removing the ink that has been applied to the center region-of the glass article.

26. The method as recited in claim 19, wherein the applying of the ink to the recessed boundary region of the glass article comprises:
applying a film on the center region but not the peripheral region of the glass article;
applying ink to the recessed boundary region and to the center region of the glass article, wherein the ink applied to the center region is applied to the film; and
subsequent to applying the ink, removing the film from the center region, thereby removing the ink that has been applied to the center region of the glass article.

27. A portable electronic device, comprising:
an electronic device housing including a bottom surface and side surfaces;
a glass cover having an outer surface that forms at least a portion of an external surface of the electronic device housing, the glass cover including:
a peripheral mounting interface on an inner surface of the glass cover and defining a recessed border area having a thickness that is less than a thickness of a central area of the glass cover; and
an ink layer in the recessed border area and defining an attachment surface that is substantially flush with the central area of the glass cover, the glass cover being affixed to the electronic device housing; and
a touch screen assembly having a top surface and a bottom surface, the touch screen assembly being provided internal to the electronic device housing, and the top surface of the touch screen assembly being adhered to the central area and at least part of the attachment surface of the glass cover.

28. The portable electronic device as recited in claim 27, wherein:
the glass cover is transparent at the central area so that the touch screen assembly is visible from outside of the portable electronic device through the central area; and
the glass cover is opaque at the recessed border area so that the touch screen assembly is not visible from outside of the portable electronic device through the recessed border area.

29. A portable electronic device, comprising:
an electronic device housing including a bottom surface and side surfaces;
a transparent cover including an outer surface that forms at least a portion of an external surface of the electronic device housing, the transparent cover including an inner surface opposite the outer surface and having a recessed area in a peripheral mounting interface substantially surrounding a central area, the recessed area including opaque material disposed thereon, the opaque material having a thickness equal to or less than a difference in thickness between the central area and the recessed area and defining an attachment surface, the transparent cover being attached to a component of the electronic device such that housing completely exposes the outer surface of the transparent cover;
a touch screen assembly having a top surface and a bottom surface, the top surface of the touch screen assembly being adjacent to the central area and the attachment surface of the inner surface of the transparent cover; and
a bonding layer of transparent adhesive between and in contact with the touch screen assembly and both the central area and the attachment surface of the transparent cover.

30. The portable electronic device as recited in claim 29, wherein the transparent cover comprises a glass cover.

31. The portable electronic device as recited in claim 29, wherein the opaque material comprises at least one layer of ink or paint.

32. The portable electronic device as recited in claim 29, wherein the transparent cover includes a first layer of a first area that provides the outer surface for the portion of the electronic device enclosure, and a second layer provided on the first layer and having a second area that provides the inner surface for the transparent cover.

33. The portable electronic device as recited in claim 29, wherein the transparent cover is transparent at the central area so that the touch screen assembly is visible from outside of the portable electronic device through the central area, and wherein the transparent cover is opaque at the recessed peripheral area so that the touch screen assembly is not visible from outside of the portable electronic device through the recessed peripheral area.

* * * * *